United States Patent Office 3,740,439
Patented June 19, 1973

3,740,439
TREATING HYPERTENSION WITH β-AMINO-ALKANE CARBOXYLIC ACIDS
Kurt Eichenberger, Therwil, Christian Egli, Rheinfelden, and Phyllis Roberta Hedwall, Basel, Switzerland, assignors to Ciba-Geigy Corporation, Ardsley, N.Y.
No Drawing. Filed June 18, 1969, Ser. No. 834,535
Claims priority, application Switzerland, June 24, 1968, 9,340/68
Int. Cl. A61k 27/00
U.S. Cl. 424—319
6 Claims

ABSTRACT OF THE DISCLOSURE

The invention concerns pharmaceutical preparations containing as antihypertensive ingredients β-amino-alkane carboxylic acids of the formula

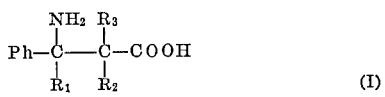

in which Ph stands for a phenyl group substituted by at least one hydroxyl group and each of $R_1$, $R_2$ and $R_3$ is hydrogen or lower alkyl, in the form of mixtures of isomers or of pure isomers, or salts thereof. It also relates to compounds of the Formula I, in which Ph, $R_1$, $R_2$ and $R_3$ have the previously given meaning in the form of mixtures of isomers or of pure isomers with the proviso that compounds of the Formula I, in which Ph is monohydroxyphenyl or 3,4-dihydroxyphenyl and each of $R_1$, $R_2$ and $R_3$ is hydrogen, are in the form of optically active antipodes, as well as salts thereof; these compounds show antihypertensive properties.

SUMMARY OF THE INVENTION

The present invention concerns β-amino-β-alkane carboxylic acids of the formula

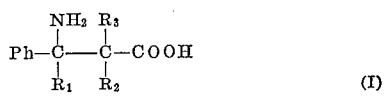

in which Ph stands for a phenyl group substituted by at least one hydroxyl group and each of $R_1$, $R_2$ and $R_3$ is hydrogen or lower alkyl, in the form of mixtures of isomers or of pure isomers with the proviso that compounds of the Formula I, in which Ph is monohydroxyphenyl or 3,4-dihydroxyphenyl and each of $R_1$, $R_2$ and $R_3$ is hydrogen, are in the form of optically active antipodes, as well as salts of such compounds, as well as pharmaceutical preparations containing compounds of the Formula I, in which Ph, $R_1$, $R_2$ and $R_3$ have the previously given meaning, in the form of mixtures of isomers or of pure isomers or pharmaceutically acceptable salts thereof. The pharmaceutical preparations are useful in the treatment of hypertensive conditions.

DESCRIPTION OF THE PREFERRED EMBODIMENTS

In the compounds mentioned above the residue Ph may contain, apart form the indicated hydroxyl groups, for example, free or functionally modified hydroxyl groups, as well as lower alkyl or trifluoromethyl as substitutents. Functionally modified hydroxyl groups are, for example, etherified hydroxyl groups, especially etherified by aliphatic or araliphatic residues, such as lower alkoxy, for example, methoxy, ethoxy, n-propoxy, isopropoxy or butoxy, lower alkenyloxy, for example, allyloxy, lower alkylenedioxy, for example, methylenedioxy, or phenyl-lower alkoxy, for example, benzyloxy, or esterified hydroxyl groups, especially those esterified by a hydrohalic or lower alkanecarboxylic acid, such as halogeno, for example, fluoro, chloro or bromo, or lower alkanoyloxy, for example, acetyloxy or propionyloxy. Lower alkyl represents, for example, methyl, ethyl, n-propyl, isopropyl, n-butyl or tertiary butyl. Substituents containing carbon contain preferably up to 7, especially up to 4 carbon atoms.

Above all, Ph represents 3,4-dihydroxyphenyl as well as 2,6-dihydroxy- or 3,4,5- or 2,3,4-trihydroxyphenyl, but it may also be 4-, more especially 2- or 3-hydroxyphenyl.

A lower alkyl group represented by $R_1$, $R_2$ or $R_3$ has, for example, the above meaning and is especially a methyl group.

The compounds may be in form of mixtures of isomers or of pure isomers. Such mixtures are above all racemates, pure isomers the optically active antipodes; when suitably substituted, the compounds may be in the form of diastereoisomers or mixtures thereof.

The compounds of the present invention have valuable properties. In addition to a sedative property, they show especially hypotensive effects, as can be shown by animal tests, for example, on renal hypertonic rats, in doses of about 0.1 to about 0.3 g. per kg. p.o. In this connection, it has been found that with hypotensive doses, in contrast to structurally similar compounds containing an α-amino-carboxylic acid grouping, the catecholamine content of the heart is not affected. The compounds of this invention are, therefore, especially useful as antihypertensive agents.

The invention primarily concerns compounds of the formula

in which $Ph_1$ represents monohydroxy- or dihydroxyphenyl, especially 2- or 3-hydroxy-phenyl or 3,4-dihydroxy-phenyl, optionally substituted by hydroxyl, methoxy, methyl or trifluoromethyl and/or halogeno, and $R_1'$ and $R_2'$ each represents hydrogen or methyl, in the form of mixtures of isomers or of pure isomers, with the proviso that compounds of the Formula Ia, in which $Ph_1$ is monohydroxyphenyl or 3,4-dihydroxyphenyl and each of $R_1'$ and $R_2'$ is hydrogen, are in the form of optically active antipodes, or salts, particularly pharmaceutically acceptable, non-toxic salts of such compounds.

Particularly outstanding antihypertensive properties are shown by the compounds of the formula

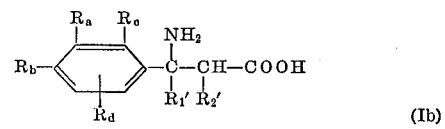

in which one of $R_a$, $R_b$ and $R_c$ is hydroxy and each of the others is hydrogen or hydroxy, $R_d$ is hydrogen, hydroxyl, methoxy, methyl or tirfluoromethyl or halogeno, and $R_1'$ and $R_2$ (each is hydrogen or methyl, in the form of mixtures of isomers or of pure isomers, with the proviso that compounds of the Formula Ib, in which each of $R_d$, $R_1'$ and $R_2'$ is hydrogen and one of $R_a$, $R_b$ and $R_c$ is hydroxyl and the others are hydrogen or $R_a$ and $R_b$ is hydroxyl and $R_c$ is hydrogen, are in the form of optically active antipodes, or salts, particularly pharmaceutically acceptable, non-toxic salts thereof.

Particularly useful hypotensive properties are shown by the pharmacologically more active optical antipode of β-amino-β-(3,4-dihydroxy-phenyl)-propionic acid or their salts, such as the pharmaceutically acceptable, non-toxic salts thereof. In animal tests, for example, on the renal hypertonic rat, these compounds display on oral administration of a dose from 0.1 to 0.3 g./kg. an excellent hypotensive effect combined with little toxicity. Similar effects are shown by the optically active antipodes of β-amino-β-(2-hydroxy-phenyl)-propionic acid and of β-amino-β-(3-hydroxy-phenyl)-propionic acid, as well as β-amino-β-(3,4,5-trihydroxyphenyl)-propionic acid,
β-amino-β-(2,3,4-trihydroxyphenyl)-propionic,
β-amino-β-(2,6-dihydroxyphenyl)-propionic acid,
β-amino-β-(3-hydroxyphenyl)-α-methyl-propionic acid and β-amino-β-(3,4-dihydroxyphenyl)-α-methyl-propionic acid in the form of mixtures of isomers or of pure isomers, as well as salts, particularly pharmaceutically acceptable, non-toxic salts thereof:

The compounds of the present invention are obtained according to per se known methods, for example, by converting in a compound of the formula

(II)

in which $Ph_0$ has the same meaning as Ph or represents a residue capable of being converted thereinto, X represents amino or a residue capable of being converted thereinto, W has the same meaning as $R_1$ or together with X and the common carbon atom represents a grouping capable of being converted into the aminomethylene group or together with Z represents a carbon-to-carbon bond, Y represents the carboxyl group or a residue capable of being converted thereinto or together with X and the carbon atoms carrying the two groups X and Y and optionally further eliminable cyclic members forms an at least 4-membered ring which is capable of being split by hydrolysis or hydrogenolysis and furnishes the grouping of the formula

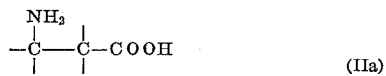

(IIa)

Z has the same meaning as $R_3$ or stands for a group capable of being replaced by hydrogen or together with W forms a carbon-to-carbon bond, and $R_2$ has the above meaning, with the proviso that at least one of the residues $Ph_0$, X, optionally together with W and Y, respectively, Y, optionally together with X, and Z, optionally together with W, stands for a residue capable of being convertible into the group Ph, into the amino group, into the carboxyl group or into hydrogen, at least such group $Ph_0$, X, optionally together with W and Y, respectively, Y, optionally together with X, or Z, optionally together with W, into the group Ph, into the amino group, into the carboxyl group and into hydrogen, respectively, and separating resulting mixtures of isomers, if desired, but in any case the resulting racemates of compounds of the Formula I, in which Ph is monohydroxyphenyl or 3,4-dihydroxyphenyl and each of $R_1$, $R_2$ and $R_3$ is hydrogen, into the pure isomers, and/or, if desired, converting a resulting compound into another compound of the Formula I, and/or, if desired, converting resulting free compounds into their salts or resulting salts into the free compounds or into other salts.

A group $Ph_0$ convertible into Ph carries at least one residue convertible into a free hydroxyl group. Such residue may be, inter alia, an etherified hydroxyl group, for example, lower alkoxy, such as methoxy, which can be converted into hydroxyl by hydrolysis, for example, by treatment with an acid, such as a hydrohalic acid, especially hydrobromic acid, or a salt formed by a weak base and a strong acid, such as an organic base, especially a tertiary amine or a heterocyclic base, and a mineral acid, such as hydrohalic acid, for example, with pyridine hydrochloride. An etherified hydroxyl may also be an α-arylalkoxy, such as a benzyloxy group, which can be converted into a hydroxyl group by hydrogenolysis, such as by treatment with hydrogen in the presence of a suitable catalyst, for example, a palladium catalyst. Likewise converted into free hydroxyl groups by hydrolysis are acyloxy groups, such as hydroxyl groups esterified by organic carboxylic or sulphonic acid or by carbonic acid monoesters; such acyloxy groups are preferably hydrolyzed in the presence of an alkaline reagent. Other hydroxyl groups acylated, for example, by carbobenzoxy groups, may be converted into the free hydroxyl group also by hydrogenolysis.

The group X may represent a residue convertible in known manner into the amino group, for example, by reduction, hydrolysis, hydrazinolysis, hydrogenolysis, acid treatment or ammonolysis. Nitro, nitroso, azido and especially hydroxyamino groups can be converted to amino groups reductively, for example, by treatment with hydrogen activated, for example, by nickel, for example, Raney nickel, platinum or palladium catalyst, preferably on a suitable carrier, with nascent hydrogen or with complex light metal hydrides, or, especially the hydroxyamino group, with reducing agents, such as hydroxylamine.

Residues X convertible hydrolytically into the amino group are, for example, acylamino groups, containing more especially readily eliminable acyl residues of carboxylic or thiocarboxylic acids, such as lower alkanecarboxylic acids, for example, formic, acetic or trifluoroacetic acid, of organic sulphonic, such as aromatic sulphonic acids, for example, p-toluenesulphonic acid, or of carbonic acid semi-derivatives, such as corresponding semi-esters or -amides, for example, carbonic acid mono-lower alkyl, e.g. -methyl or -ethyl esters. Acyl residues of that kind may be split hydrolytically, for example, by acid or alkaline hydrolysis. A tert.-butyloxycarbonylamino residue X can be split, for example, under water-free conditions, by treatment with a suitable acid, such as trifluoroacetic acid. Furthermore, a residue X representing the isocyanato or isothiocyanato group can be converted into the amino group by hydrolysis, for example, by treatment with water.

From a phthalimido group, the amino group can be liberated, for example, by treatment with hydrazine, optionally in the form of its hydrate.

Split off by hydrogenolysis are, for example, certain α-arylalkyl residues substituting the amino group, such as benzyl or trityl residues, or certain etherified hydroxycarbonyl groups acylating the amino group, such as carbobenzyloxy for example, by treatment with hydrogen activated by a platinum or palladium catalyst. Other amino groups acylated with certain carbonic acid semi-esters, such as carbo-β-halogeno-lower alkoxy, for example, with carbo - 2,2,2 - trichloroethoxy groups, can be converted into amino, for example, by treatment with nascent hydrogen, as obtained by the reaction of hydrogen donors, such as acetic acid, preferably containing water, upon metals, for example, zinc, or metal compounds, such as chromium-II-acetate.

Ammonolytic conversion into the amino group may be used, for example, when X represents a reactive esterified hydroxyl group, such as halogeno, for example, chloro, especially one of a high molecular weight, for example, bromo or iodo, or an organic sulphonyloxy group, such as an aliphatic sulphonyloxy, for example, methanesulphonyloxy, ethanesulphonyloxy or 2-hydroxyethanesulphonyloxy, or an aromatic sulphonyloxy group, for example, p-toluenesulphonyloxy, p-bromophenylsulphonyloxy, m- or p-nitrophenylsulphonyloxy, group. Ammonolysis may be performed, for example, by treatment with ammonia or an amide of a metal, such as an alkali metal amide, for example, lithium, sodium or potassium amide.

A grouping convertible into the aminomethylene group, formed by the groups X and W together with the common carbon atom, is, for example, a hydroxyiminomethylene or iminomethylene group. Such groups can be converted into the desired aminomethylene group by reduction and simultaneous saturation of the N=C double bond, for example, by treatment with catalytically activated hydrogen or with a suitable complex metal hydride.

A bond represented by W and Z together, which forms a double bond between the two carbon atoms substituted by these two groups, can be eliminated by reduction, for example, by treatment with catalytically activated hydrogen.

A residue Y can be converted into the carboxyl group, for example, by hydrolysis, acid treatment, hydrogenolysis, oxidation or decarbonylation. By hydrolysis it is possible to convert, for example, esterified carboxyl groups, such as carbo-lower alkoxy, e.g. carbomethoxy or carbethoxy, amidated carboxyl or thiocarboxyl groups, such as a carbamyl or thiocarbamyl group optionally N-substituted, for example, N-alkylated, or cyano groups, into the free carboxyl group, the hydrolysis being performed in the presence of alkaline or acidic reagents depending on the type of group Y involved. Esterified carboxyl groups convertible into the carboxyl group by acid treatment under anhydrous conditions, e.g. with trifluoroacetic acid, are, for example, carbo-tert.-butyloxy and carbo-diphenylmethoxy. Hydrogenolytic splitting is suitable, for example, for certain esterified carboxyl groups, a carbo-2-halogeno-lower alkoxy, e.g. carbo-2,2,2-trichloroethoxy, for instance, by treatment with nascent hydrogen produced, for example, by the action of zinc or chromium-II-acetate upon aqueous acetic acid; a carbo-α-phenyl-lower alkoxy group, such as carbobenzyloxy, for example, by treatment with catalytically activated hydrogen. Conversion into the carboxyl group by oxidation is possible, inter alia, for a carbinol or formyl group, for example, by treatment with a suitable oxidation reagent, such as a heavy metal salt or oxide, e.g. chromium-VI-oxide in an acidic medium. A carboxycarbonyl group may be converted into a carboxyl group by the usual decarbonylation methods, for example, under acidic conditions, as in the presence of sulfuric acid.

An eliminable group Z is, for example, a carboxyl group, which can be replaced by hydrogen by elimination of carbon dioxide, for example, pyrolytically.

A ring containing at least 4, preferably 4 to 6 members, formed by the groups X and Y together with the two carbon atoms carrying these groups and possibly further eliminable ring members, which can be split hydrolytically or hydrogenolytically and supplies in the final product the grouping of the Formula IIa, can be spit in known manner, for example, by hydrolysis or reduction, to form the desired free carboxyl and amino groups. Such cyclic systems are among others the 4-membered lactam ring, which is split by hydrolysis, for example, in an acid medium, e.g. in the presence of aqueous sulfuric acid, as well as an isoxazoline-5-one or isoxazolidin-5-one ring which may be split reductively in the desired manner, for example, by treatment with hydrogen in the presence of a catalyst, such as a nickel, palladium or platinum catalyst, if necessary, followed by hydrolysis. Suitable is also the 4,5 - dihydro-1,3-oxazin-6-one ring system for splitting with liberation of the carboxyl and amino groups; it may be converted, for example, hydrolytically, into the desired α-carboxy-β-amino grouping.

The separation of resulting mixtures of isomers into the pure isomers may be carried out in a per se known manner. Resulting racemates, in which free hydroxy groups are optionally protected, for example, acylated or etherified, may be converted into salts, preferably into salts with optically active bases, such as optically active α-phenyl-ethylamine, α-(1 - naphthyl)-ethylamine, quinine, cinchonidine or brucin, as well as into acid addition salts with suitable optically active acids. The resulting mixtures of diastereoisomeric salts are then separated into the single salts on the basis of physico-chemical differences, such as of solubility, crystallization, etc., and the optically active antipodes are liberated from the salts. Furthermore, resulting racemates may also be resolved into the optically active antipodes by fractional crystallization, optionally from an optically active solvent, or by chromatography, particularly thin layer chromatography, on an optically active carrier material. Mixtures of diastereoisomeric compounds are separated in the usual way on the basis of physico-chemical differences, such as those of solubility or boiling points, etc., for example, by fractionated crystallization or distillation, into the pure isomeric compounds. Preferably, the pharmacologically more active isomer, particularly optically active antipode, is isolated.

If desired, substituents of the residue Ph in resulting compounds may be converted within the given definition one into others. Thus, for example, etherified hydroxyl groups, such as lower alkoxy or phenyl-lower alkoxy, can be converted into free hydroxyl groups in the usual manner, for example, by hydrolysis or hydrogenolysis.

The reactions of this invention are carried out in known manner, during which it is possible to convert simultaneously or stepwise also more than one convertible grouping in the desired manner. The reactions are performed with the use of the conventional hydrolytic, reducing or hydrogenolytic reagents, chosen to suit the residues $Ph_0$, W, X, Y and Z to be converted, preferably in the presence of solvents or diluents or mixtures thereof and, if desired or necessary, with cooling or heating and/or in the presence of catalysts and/or activating reagents and/or under superatmospheric pressure and/or in an inert gas, such as nitrogen.

The starting materials, if new, are prepared according to per se known produces. For example, a group X may be introduced by exchanging another group occupying its position, during which procedure a hydroxy group in the residue Ph and/or the carboxyl group may temporarily be protected. Starting materials, in which $Ph_0$ represents the residue capable of being converted into the group Ph, may be prepared, for example, by building up the β-aminoalkanecarboxylic acid-side chain in compounds, which contain the residue $Ph_0$, according to the indicated procedures. Reactive esterified hydroxy groups X may be introduced, for example, by esterifying the corresponding hydroxy group by treatment with suitable reagents, such as halogenating agents or organic sulfonic acid halides, or by adding hydrogen halide to the double bond of an α,β-unsaturated carboxylic acid compound. In starting materials, in which X represents a reactive esterified hydroxy group, such group may be replaced according to the usual methods by other groups capable of being converted into an amino group, for example, by treatment with the appropriate and corresponding alkali metal or ammonium salts; a nitroso group may be introduced by treatment of a β-oxo-alkanecarboxylic acid compound with hydroxylamine. Protected, such as acylated amino groups or amino groups substituted by α-arylalkyl groups are usually introduced at an earlier stage in the preparation of the starting materials and the remainder of the molecule is then built up; as the last step in the preparation of compounds of the Formula I, the amino group is then liberated. The same applies to starting materials with a functionally converted carboxyl group Y; such group is introduced at an early stage, the remaining groups are built-in to the molecule and the protected carboxyl group is then liberated. A carbinol or formyl group which is converted into a carboxyl group by oxidation, may be obtained from an esterified carboxyl group or a halogenocarbonyl group by suitable reduction, preferably at an early stage. A lactam grouping formed by the groups X and Y together amy be obtained, for example by elimination of alcohol from a β-aminoalkaneimidic acid ester, whereas isoxasolidin-5-one compounds are obtained by ring-closure of β-oximino-alkanecarboxylic acid esters in an acidic medium and 4,5- dihydro-1,3-oxazin-5-one compounds by ring-closure of β-acetylaminoalkaneimidic acid esters.

Starting materials with an asymmetric center may be used in the form of mixtures of isomers, e.g. racemates, or of pure isomers, e.g. optically active antipodes; mixtures of isomers of starting materials may be resolved into the pure isomers, for example, according to the previously described method prior to being further used.

The invention includes also any modification of the process, in which a starting material is used in the form of one of its derivatives, for example, of a salt thereof, or is formed under the reaction conditions, or in which an intermediate obtained at any stage of the process is used as starting material and any remaining steps are carried out or the process is discontinued at any stage. Thus, it is particularly advantageous to start from a compound of the formula Ph—C($R_1$)=C($R_2$)—COOH (IIb) and then react it with an excess of hydroxylamine, whereby at first as an intermediate the actual starting material, namely a β-Ph-β-hydroxyaminopropionic acid of the formula Ph—C($R_1$)(NHOH)—CH($R_2$)—COOH (IIc) is formed, which is reduced by the excess of hydroxylamine present to the desired β-Ph-β-amino-propionic acid. Furthermore, for example, a compound of the formula Ph—CH($NH_2$)—CH(COOH)—COOH (IId)

forms as a non-isolated product from the reaction of an aldehyde of the formula Ph—CHO (IIe) with ammonia or ammonium acetate and malonic acid in the presence of an absolute or aqueous lower alkanol, e.g. ethanol or isopropanol, or by the reaction of a hydrobenzamide of the formula Ph—CH(N=CH—Ph)—N=CH—Ph (IIf) with malonic acid in the presence of an aqueous lower alkanol, e.g. ethanol. Under the reaction conditions, i.e. while heating, carbon dioxide is eliminated from the reaction product of the Formula IId used as starting material according to the present process and the desired product is obtained directly.

It is advantageous to use starting materials that give rise to the compounds designated above as being particularly valuable.

Depending on the starting materials and reaction conditions used the compounds are obtained in free form or in form of their salts. Salts can be converted into the free compounds in known manner, acid addition salts, for instance, by reaction with a basic agent, and metal salts by reaction with an acid reagent. If desired, these exchange reactions may be performed on ion exchange resins (in solid form on columns or in liquid form by counter-current distribution).

On the other hand, resulting free compounds may form salts, preferably non-toxic, pharmaceutically acceptable salts with inorganic or organic acids or with metals, for example, alkali or alkaline earth metals, or with ammonia or suitable amines. Acid addition salts are preferably manufactured with inorganic acids, for example, hydrohalic acids, such as hydrochloric or hydrobromic acid, perchloric, nitric or thiocyanic acid, sulphuric or phosphoric acids, or with organic carboxylic or sulphonic acids, such as formic, acetic, propionic, glycolic, lactic, pyruvic oxalic, malonic, succinic, maleic, fumaric, malic, tartari, citric, hydroxymaleic, dihydroxymaleic, benzoic, phenylacetic, 4-aminobenzoic, 4-hydroxybenzoic, anthranilic, cinnamic, mandelic, salicyclic, 4-aminosalicylic, 2-phenoxybenzoic, 2-acetoxybenzoic, nicotinic, isonicotinic, embonic, methanesulphonic, ethanesulphonic, hydroxyethanesulphonic, benzenesulphonic, p-toluenesulphonic, naphthalenesulphonic, N-cyclohexylsulphamic or sulphanilic acid, as well as ascorbic acid. Metal and ammonium salts are prepared, for example, by treatment with alkali metal, such as potassium or sodium carbonates or hydrogen carbonates or hydroxides, or the corresponding alkaline earth mefal, e.g. calcium or magnesium compounds, or ammonia, as well as amines, such as aliphatic, for example, lower alkyl amines, e.g. trimethylamine or triethyl amine.

Salts, for example, acid addition salts, with the above-mentioned acids or others, such as metal acids or acidic nitro compounds, may also be used for purification purposes by isolating the salts from the reaction mixtures and recovering the free compound from them. In view of the close relationship of the new compounds in free form with those in the form of their salts what has been said above and hereinafter with reference to the free compounds or the salts concerns also the corresponding salts and free compounds, respectively, wherever such is possible under the circumstances.

The following examples illustrate the present invention; temperatures are given in degrees centigrade.

EXAMPLE 1

A hot solution of 9.9 g. of sodium in 330 ml. of absolute ethanol is mixed with a hot solution of 29.9 g. of hydroxylamine hydrochloride in a small quantity of water. The mixture is rapidly cooled, the precipitated sodium chloride is filtered off and the filtrate, which contains the free hydroxylamine, is refluxed with 29.9 g. of caffeic acid. After one hour, the boiling solution is treated with activated charcoal and filtered. Another 30 ml. of water are added to the filtrate and the whole is further refluxed for 4 hours, then cooled, and the crystalline precipitate, which contains β-amino-β-(3,4 - dihydroxyl-phenyl) - propionic acid of the formula

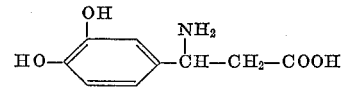

is filtered off and dissolved with heating in 20 ml. of ethanolic 2 N hydrogen chloride. On addition of ether, the β-amino-α-(3,4-dihydroxyphenyl)-propionic acid hydrochloride, M.P. 186°, precipitates.

The resulting free racemate is converted into the salt with an optically active base, such as (+)-α-phenyl-ethyl amine. The resulting mixture is separated, for example, by fractionated crystallization, into the salts of the optically active antipodes, and from the salts one obtains by treatment with an acidic reagent the free (+)-β-amino-β-(3,4-dihydroxy-phenyl)-propionic acid and (−)-β-amino-β-(3,4-dihydroxy-phenyl)-propionic acid, which may be converted, if desired, into their salts.

EXAMPLE 2

A hot solution of 7.25 g. of sodium in 120 ml. of absolute ethanol is mixed with a hot solution of 22 g. of hydroxylamine hydrochloride in a small quantity of water and then rapidly cooled. The precipitated sodium chloride is filtered off and the filtrate mixed with 10.2 g. of m-hydroxy-α-methylcinnamic acid and refluxed for 8 days. After cooling, the crystalline material is filtered off and washed with ethanol. The resulting β-(3-hydroxyphenyl)-α-methyl-propionic acid of the formula

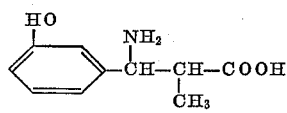

melts at 264–265°.

EXAMPLE 3

A solution of 12 g. of sodium in 400 ml. anhydrous ethanol is treated with a warm solution of 36 g. of hydroxylamine hydrochloride in 25 ml. of water. The mixture is cooled, the sodium chloride is filtered off and the filtrate is treated with 33 g. of m-hydroxy-cinnamic acid. The mixture is refluxed for 5 hours, then allowed to stand for 12 hours at room temperature and filtered. The filter residue is crystallized from water to yield the β-amino-β-(3-hydroxyphenyl)-propionic acid of the formula

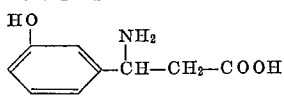

which melts at 235–236°.

The resulting free racemate is converted into the salt with an optically active base, such as (+)-a-phenylethyl amine. The resulting mixture is separated, for example, by fractionated crystallization, into the salts of the optically active antipodes, and from the salts one obtains by treatment with an acidic reagent the free (+)-β-amino-β-(3-hydroxyl-phenyl)-propionic acid and (−)-β-amino-β-(3-hydroxy-phenyl)-propionic acid, which may be converted, if desired, into their salts.

EXAMPLE 4

A solution of 12 g. sodium in 400 ml. of anhydrous ethanol is treated with a hot solution of 36 g. of hydroxylamine hydrochloride in 30 ml. water. The precipitated sodium chloride is filtered off and the filtrate is treated with 29.2 g. of o-hydroxy-cinnamic acid. The mixture is refluxed during 11 hours and the precipitate is filtered off and washed with ethanol. The resulting β-amino-β-(2-hydroxy-phenyl)-propionic acid of the formula

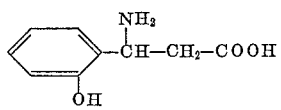

melts at 235–236°. The corresponding hydrochloride is prepared by treatment of the free compound with an excess of 2 N ethanolic hydrogen chloride and dilution with ether; the β-amino-β-(2-hydroxy-phenyl)-propionic acid hydrochloride melts at 181–183°.

The resulting free racemate is converted into the salt with an optically active base, such as (+)-a-phenylethyl amine. The resulting mixture is separated, for example, by fractionated crystallization, into the salts of the optically active antipodes, and from the salts one obtains by treatment with an acidic reagent the free (+)-β-amino-β-(2-hydroxy-phenyl)-propionic acid and (−)-β-amino-β-(2-hydroxy-phenyl)-propionic acid, which may be converted, if desired, into their salts.

The present invention also concerns new pharmaceutical preparations which contain as hypotensive agents compouds of the Formula I, in which Ph, $R_1$, $R_2$ and $R_3$ have the previously given meaning, particularly compounds of the Formula Ia, in which $Ph_1$, $R_1'$ and $R_2'$ have the previously given meaning, and above all compounds of the Formula Ib, in which $R_a$, $R_b$, $R_c$, $R_d$, $R_1'$ and $R_2'$ have the previously given meaning; in the first place, active agents are the β-amino-β-(3,4-dihydroxyl-phenyl)-propionic acid, β-amino-β-(2-hydroxy-phenyl)-propionic acid or β-amino-β-(3-hydroxy-phenyl)-propionic acid and the β-amino-β-(3-hydroxy-phenyl)-a-methyl-propionic acid. The above compounds of the Formulas I, Ia and Ib and the specific compounds mentioned may be used in the pharmaceutical preparations in the form of mixtures of isomers or of pure isomers and/or pharmaceutically acceptable, non-toxic salts.

The new pharmaceutical preparations contain preferably from about 5% to about 95%, solid preparations for instance from about 25 to about 95% and liquid preparations from about 5% to about 25%, of the pharmacologically active compound. Solid pharmaceuticals for oral administration, for example, tablets, capsules or dragées, contain from about 0.2 g. to about 1.5 g. preferably about 0.3 g. to about 1.0 g., of the active substance per unit dose; liquid preparations, such as solutions or suspensions, contain from about 0.05 g./ml. to about 0.2 g./ml. of the active substance.

The present invention further includes the treatment of hypertension with the use of the above-mentioned pharmaceutical preparations, this treatment being performed with daily doses from about 0.5 g. to about 5.0 g., preferably about 1.5 g. to about 3 g., of the pharmacologically active substance.

The new pharmaceutical preparations are formulated in known manner, generally by mixing the active substance with a pharmaceutical organic or inorganic, solid or liquid exipient suitable for enteral, for example, oral or parenteral administration. Suitable excipients are substances that do not react with the new compounds, for example, water, gelatin, sugars, such as lactose or glucose, starches, such as corn, wheat or rice starch, stearic acid or salts thereof, such as calcium or magnesium stearate, talcum, vegetable oils, benzyl alcohols, gums, polyalkyleneglycols or other known medicinal excipients. The pharmaceutical preparations may be sterilized and/or contain auxilary substances, such as preserving, stabilizing, wetting or emulsifying agents, salts for regulating the osmotic pressure or buffers.

Apart from the above-mentioned pharmacologically active compounds the pharmaceutical preparations of this invention may contain further therapeutically active substances, for example, other hypotensive agents, especially Rauwolfia alkaloids, such as reserpine, rescinnamine or deserpidine, and similar compounds, such as syrosingopine, veratrum alkaloids, such as germine or protoveratrine, or above all synthetic agents acting as antihypertensives and/or diurectics, such as chlorothiazide, hydrochlorothiazide, cyclopenthiazide, or analogous compounds, 3-(3-sulphamyl-4-chlorophenyl) - 3 - hydroxy-isoindolin-1-one, hydralazine, dihydralazine, guanethidine, or ganglionic blockers, such as chloroisondamine.

The following examples illustrate the invention.

EXAMPLE 5

Tablets, containing each 0.5 g. of the active ingredient may be prepared as follows.

| Composition (for 10,000 tablets): | G. |
|---|---|
| β-Amino-β-(3,4 - dihydroxyphenyl) - propionic acid hydrochloride | 5000 |
| Lactose | 600 |
| Wheat starch | 200 |
| Colloidal silica | 200 |
| Microcrystalline cellulose | 670 |
| Talcum | 300 |
| Magnesium stearate | 30 |

A mixture of β-amino-β-(3,4-dihydroxyphenyl)-propionic acid hydrochloride, lactose, wheat starch and colloidal silica is sieved and granulated with a mixture of ethanol and water. The dried and sieved granulate is homogeneously mixed with the microcrystalline cellulose, the talcum and the magnesium stearate and the mixture compressed into tablets weighing 0.7 g. each.

EXAMPLE 6

Tablets containing each 0.4 g. of the active ingredient may be manufactured as follows.

| Composition (for 2000 tablets): | G. |
|---|---|
| β-amino-β-(3-hydroxyphenyl) - α - methylpropionic acid | 800 |
| Lactose | 120 |
| Wheat starch | 40 |
| Colloidal silica | 40 |
| Microcrystalline cellulose | 134 |
| Talcum | 60 |
| Magnesium stearate | 6 |

Tablets, each weighing 0.6 g., are manufactured as described in Example 5.

What is claimed is:

1. A method for treating hypertension which comprises administering to a mammal an antihypertensive effective amount of a member selected from the group consisting of a compound of the formula

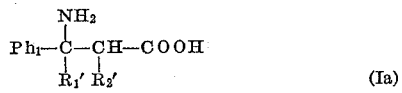 (Ia)

in which $Ph_1$ is a member selected from the group consisting of monohydroxy- and dihydroxy-phenyl and a member selected from the group consisting of monohydroxy- and dihydroxy-phenyl substituted by a member selected from the group consisting of hydroxy, methoxy, methyl, trifluoromethyl, fluoro, chloro and bromo, and each of $R_1'$ and $R_2'$ stands for a member selected from the group consisting of hydrogen and methyl, in the form of a member selected from the group consisting of a mixture of isomers and of pure isomers and a pharmaceutically acceptable salt thereof, in a pharmaceutical excipient.

2. The method of claim 1 comprising an antihypertensive effective amount of a member selected from the group consisting of a compound of the formula

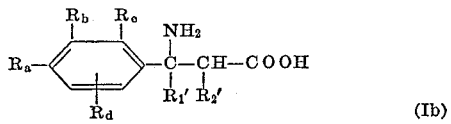 (Ib)

in which one of $R_a$, $R_b$ and $R_c$ is hydroxy and each of the others is a member selected from the group consisting of hydrogen and hydroxy, and $R_d$ is a member selected from the group consisting of hydrogen, hydroxy, methoxy, methyl, trifluoromethyl, fluoro, chloro and bromo, and each of $R_1'$ and $R_2'$ is a member selected from the group consisting of hydrogen and methyl, in the form of a member selected from the group consisting of a mixture of isomers and of pure isomers, and a pharmaceutically acceptable salt thereof, in a pharmaceutical excepient.

3. The method of claim 1 comprising an antihypertensive effective amount of a member selected from the group consisting of β-amino-β-(2-hydroxy-phenyl)-prioionic acid in the form of a member selected from the group consisting of a mixture of isomers and of pure isomers, and a pharmaceutically acceptable salt thereof, in a pharmacetical excepient.

4. The method of claim 1 comprising an antihypertensive effective amount of a member selected from the group consisting of β-amino-β-(3-hydroxy - phenyl) - propionic acid in the form of a member selected from the group consisting of a mixture of isomers and of pure isomers, and a pharmaceutically acceptable salt thereof, in a pharmaceutical excipient.

5. The method of claim 1 comprising an antihypertensive effective amount of a member selected from the group consisting of β-amino-β-(3,4-dihydroxy-phenyl)-propionic acid in the form of a member selected from the group consisting of a mixture of isomers and of pure isomers, and a pharmaceutically acceptable salt thereof, in a pharmaceutical excipient.

6. The method of claim 1 comprising an antihypertensive effective amount of a member selected from the group consisting of β-amino-β-(3-hydroxy-phenyl)-α-methyl-propionic acid in the form of a member selected from the group consisting of a mixture of isomers and of pure isomers, and a pharmaceutically acceptable salt thereof, in a pharmaceutical excipient.

References Cited

UNITED STATES PATENTS 3,362,879   1/1968   Udenfriend et al. ____ 424—319
3,544,623   12/1970  Hansen et al. _____ 424—319

OTHER REFERENCES

Oort et al.: Chem. Abst., vol. 57 (1960), p. 2605i.
Kozyrev et al.: Chem. Abst., vol. 68 (1968), p. 11324p.
Hartman, et al.: Chem. Abst., vol. 50 (1956), pp. 1956h and 1957a.
Chem. Abst. Subject Index, 6th Collective Index, 1957–1961, p. 5849S.

SAM ROSEN, Primary Examiner